June 15, 1926.
W. J. WILSON
1,588,564
MINING AND LOADING APPARATUS
Filed Dec. 19, 1921   2 Sheets-Sheet 2
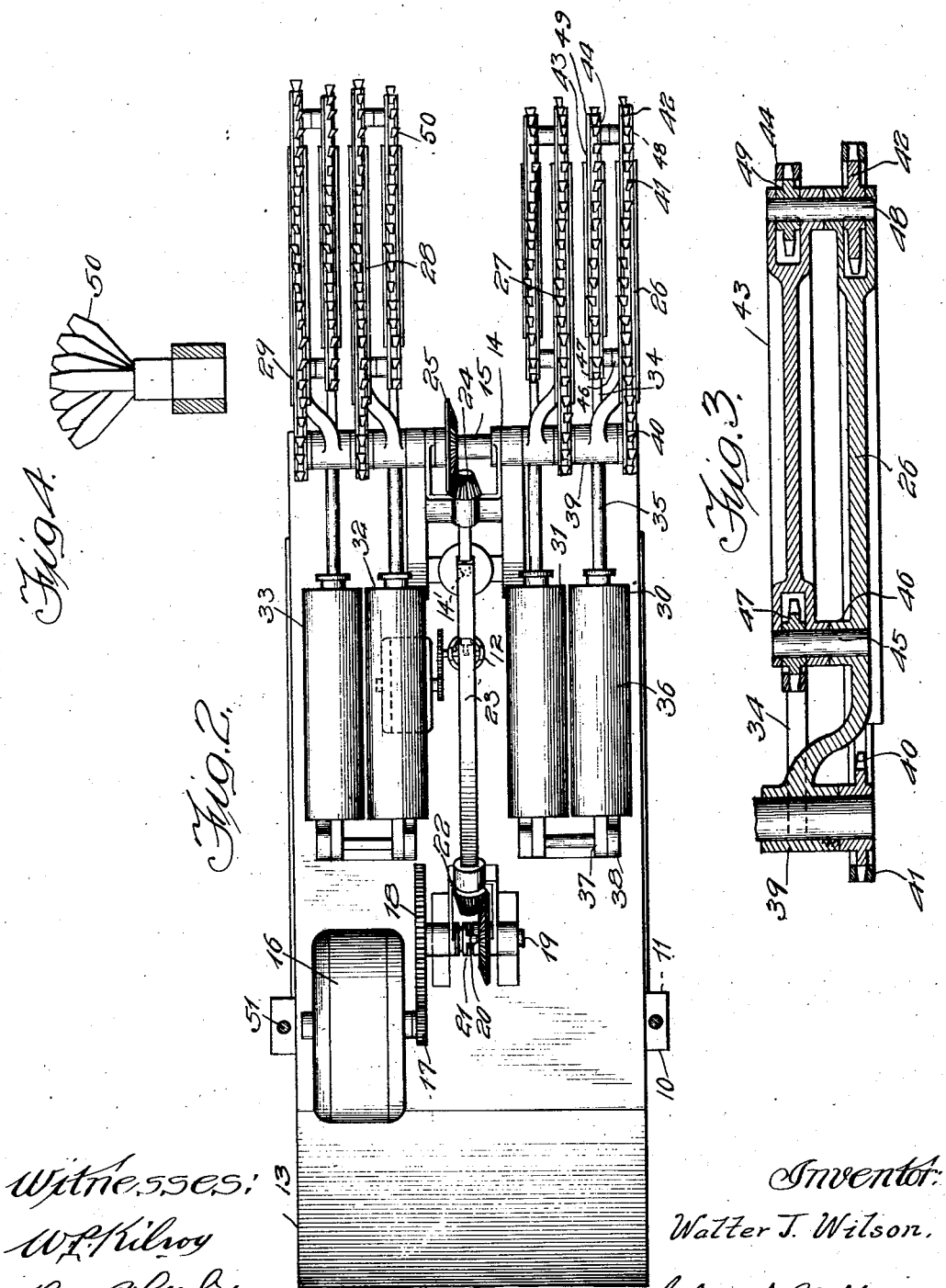

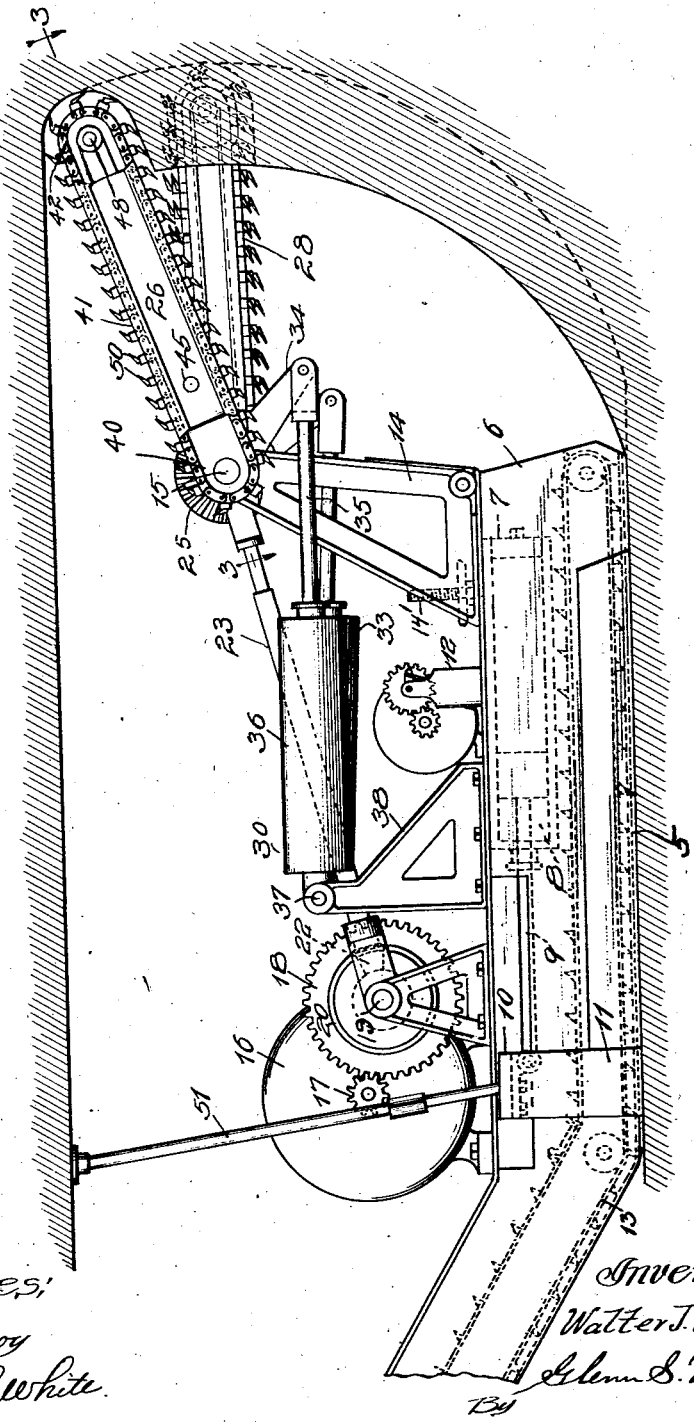

Patented June 15, 1926.

1,588,564

UNITED STATES PATENT OFFICE.

WALTER J. WILSON, OF SEWICKLEY, PENNSYLVANIA.

MINING AND LOADING APPARATUS.

Application filed December 19, 1921. Serial No. 523,455.

While this invention relates to machines or apparatus intended for general mining purposes, it is particularly adapted for mining coal and is constructed with a view of attacking the coal in a manner which will be most favorable to mining and removing the same with the least possible amount of power.

The objects of this invention are to provide an improved apparatus for mining coal or the like and also for conveying the same back from the cutting face for loading onto cars; to provide a machine having a plurality of vertically movable cutter arms which are to be actuated independently of each other; to provide a machine in which one cutter arm will operate in advance of the other so that the second cutter arm may be removing material which is unsupported on the side of the cut as well as on the face and in general to provide such an improved apparatus as will be described more fully in the following specifications.

In the accompanying drawings illustrating this invention,

Figure 1 is a side view showing the machine in operative position;

Figure 2 is a plan view;

Figure 3 is a section taken on the line 3—3 of Figure 1; and

Figure 4 is a detail showing the distribution of the bits on the cutting chains.

This improved machine has a bottom pan or base 5 which is adapted to be moved around on the floor of the mine. The carriage or frame 6 is slidably mounted in the pan 5 and is reciprocated by means of a hydraulic jack 7. The cylinder 8 is secured to the carriage while the piston rod 9 is secured at its outer end to a cross bar 10 which is carried by uprights 11 on the pan 5. The cylinder may be supplied with fluid from any suitable source as from a pump 12 but the connections are omitted as they form no part of the present invention. A conveyer 13 extends from the front of the carriage 6 backwardly and then upward to discharge into cars or the like. This conveyer may be driven in any convenient manner as by means of a motor at the upper end thereof, such motor being omitted for convenience in illustration.

The carriage 6 has two brackets 14 hinged at the forward end, and having swinging means such as the screws 14', these brackets having suitable bearings for a transverse shaft 15 at the top thereof. This shaft is driven by a motor 16 through suitable transmission mechanism. This mechanism comprises a pinion 17 on the motor 16 which drives a gear 18 on a cross shaft 19 mounted in bearings on the carriage 6. A bevel gear 20 is mounted on the shaft 19 and is driven by a clutch 21. The gear 20 meshes with a bevel bear 22 on a telescoping driving shaft 23 which shaft is mounted in suitable bearings and carries a bevel gear 24 at its forward end which meshes with a bevel gear 25 secured to the shaft 15.

A series of cutter bars 26, 27, 28 and 29 are pivotally mounted on the shaft 15 and each arm is swung or operated by a corresponding hydraulic jack 30, 31, 32 or 33. As the construction of the several bars and their connections with the jacks is substantially the same it will only be necessary to describe one of them. For instance, the bar 26 has a downwardly extending arm 34 which is connected to the piston rod 35 of the cylinder 36 of the jack 30. The end of the cylinder 36 is pivoted on a cross shaft 37 which is mounted in brackets 38 on the carriage 6. These cylinders may be supplied with fluid from any suitable source as from the pump 12 and any suitable controlling devices may be provided whereby the operator may control each cylinder separately, but these devices are of well-known construction and are therefore omitted from the drawings.

The cutter bar 26 is offset from its bearing 39 so that the driving sprocket 40 on the shaft 15 will be in alignment with the bar and will drive the chain 41 which is guided at its outer end by the sprocket 42. An auxiliary cutter bar 43 is carried by the cutter bar 26 and serves to support an auxiliary cutter chain 44. In the construction shown, a stub shaft 45 is secured in a hub 46 at the rear end of the bar 26 and engages with the rear end of the bar 43. A guide sprocket 47 is mounted on the stub shaft 45 and serves to guide the chain 44. At the outer end of the arm 26 a stub shaft 48 is rotatably mounted in a bearing at the end of the bar 26 and is keyed or otherwise secured to the sprocket 42 so that it is driven by said sprocket. This shaft also engages with a bearing in the outer end of the arm 43 and serves to support the end of this arm. A driving sprocket 49 is also secured to the shaft 48 and serves to drive the chain 44. The driving sprocket 49 is preferably somewhat smaller than the sprocket 42 so that these cutter chains will make cuts of different depths in the face of the coal. The bits 50 are preferably arranged in the chains in various positions, as for instance, at seven different angles as shown in Figure 4. The cutter bars 26 and 27 and the bars 28 and 29 are arranged so that each set will serve to cut all of the material within the path thereof and a space is left between these sets which is substantially as wide as the respective sets. With this arrangement a cut is made with the machine in one position and then the machine is swung or shifted so that one set will cut the material left between them in the preceding cut while the other set will make a cut at one side of the original position and in this way all of the material will be excavated in a space approximately one and one-fourth times the width of the machine for each cut.

While the machine may be operated in various ways in accordance with different mining conditions, the following operation may be considered as a typical one for ordinary practice. The machine is brought into position adjacent to the face and the cutter arms are swung upwardly by the hydraulic jacks so as to bring the cutters into position to make a sumping cut adjacent to the roof. This cut is made by feeding the carriage 6 forwardly by means of the hydraulic jack 7 and during this operation the pan is preferably held by means of jacks 51 which may be arranged in any suitable position. When the sumping cut has been made, the cutter arms are swung downwardly so as to make arcuate cuts as indicated in Figure 1. In this downward movement the feeding is assisted by gravity but the controlling jacks may be used as far as necessary. It will also be noted that by moving the carriage 6 the form of the cut may be varied. In this downward movement of the cutter arms one arm is preferably moved slightly in advance of the adjacent one so that the material which is cut by the following arm will be unsupported on the corresponding side. This together with the irregular depths caused by the different lengths of the cutter arms will tend to break out large pieces of material. Furthermore, after the first cut has been made and the machine is swung to cut out the rib left between the sets of cutters practically all of the coal in this rib will be unsupported at the sides so that large portions may be broken away. After the material is mined and brought out to the face it falls down to the bottom of the machine where it is collected by the conveyer 13 and carried back to be dumped into cars or the like.

From this description it will be seen that I provide a machine which is comparatively simple in construction and one which is adapted to attack coal in a favorable manner for mining the same with the least amount of power and one which will also produce large cuttings of mined material.

Having thus described my invention, what I claim is:

1. A mining machine comprising a bottom pan, a carriage slidably mounted on said pan, means for moving said carriage, a plurality of cutter arms mounted on said carriage and adapted to swing vertically and means which may be manually controlled during the operation of the machine for swinging each arm independently of the other arms.

2. A mining and loading machine comprising a base, a carriage slidably mounted in said base, means for reciprocating said carriage, a conveyer in the carriage and extending rearwardly of the machine, a plurality of cutter arms pivotally mounted on said carriage adapted to swing vertically and means for swinging each of said cutter arms and means which may be manually controlled during the operation of the machine for regulating the swinging of said arms.

3. The combination of a base, a slidable carriage mounted in said base, a hydraulic jack for reciprocating said carriage, a horizontal shaft supported on said carriage, a motor, means for driving the shaft from the motor, a plurality of cutter arms mounted on said shaft and adapted to swing vertically, cutter chains carried by said arms and driven by said shaft and a hydraulic jack connected with each of said arms for swinging the same.

4. The combination of a bottom pan, a carriage mounted in the pan, a hydraulic jack for reciprocating said carriage, a conveyer arranged lengthwise of the carriage and extending rearwardly thereof, a support at the forward end of the carriage, a horizontal shaft mounted in said support, a motor, means for turning the shaft from the motor, a plurality of cutter bars mounted on said shaft and provided with cutter chains, means for driving the chains from said shaft, each of said bars being provided with an auxiliary bar having a cutter chain mounted thereon and driven by the chain on the main cutter bar, arms projecting from said bars and hydraulic jacks connected with said arms and adapted to swing the cutter bars.

5. In a mining machine, the combination of a support, a horizontal shaft mounted in said support, means for turning said shaft, a plurality of cutter bars pivotally mounted on said shaft each bar having an offset bearing, drive sprockets secured to the shaft in alignment with the respective bars, guide sprockets at the outer ends of the bars, cutter chains mounted on said sprockets, auxiliary cutter bars secured to the first-named bars, guide sprockets at the inner ends of the auxiliary bars, driving sprockets at the outer ends of the auxiliary bars, said driving sprockets being rotatably connected with the guide sprockets of the first-named bars, and cutter chains mounted on the sprockets of the auxiliary bars.

6. The combination with a cutter arm having a cutter chain provided with cutting bits, of a second cutter arm secured to the first-named arm and provided with a cutter chain and means for driving the second chain from the first chain, the arrangement being such that the cutter chains will cut a kerf sufficiently wide to clear the combined arms.

7. In a mining machine, the combination of a support, a shaft mounted in said support, means for driving said shaft, a plurality of cutter arms mounted on said shaft, cutter chains carried by said arms, means for driving the chains from said shaft, and manually controlled power means for swinging each arm independently of the other arms.

8. In a mining machine, the combination of a plurality of cutter arms, a common shaft on which said arms are mounted, cutter chains carried by said arms and driven by said shaft, said arms being arranged in sets containing two or more arms with a space between the sets and means for swinging each arm independently of the other arms.

9. In a mining machine, the combination of a support, brackets mounted on said support, a horizontal shaft mounted in said brackets, a motor, means for driving the shaft from the motor, a plurality of cutter arms mounted on said shaft, each arm having a cutter chain driven from the shaft and also having an auxiliary cutter chain with a cutting chain driven from the chain on the main arm and manually controlled means for swinging said arms.

10. In a mining machine, the combination of a shaft, a bearing on said shaft, an offset arm carried by the bearing, a drive sprocket on the shaft in alignment with the arm, a stub shaft mounted in a bearing at the outer end of the arm, a sprocket secured to said stub shaft, a cutter chain mounted on said sprockets, an auxiliary arm secured to the side of the first named arm, a guide sprocket at the inner end of said auxiliary arm, a driving sprocket at the outer end of the arm secured to said stub shaft, and a cutter chain carried by the last named sprocket.

11. The combination with a main cutter arm having a cutting chain, of an auxiliary cutter arm secured thereto and carried thereby and having a chain provided with cutting bits driven from a chain on the main arm, the bits on said chains being arranged to cut a kerf adapted to clear said arms and cutter chains.

WALTER J. WILSON.